United States Patent [19]

Hayashi et al.

[11] Patent Number: 5,013,712

[45] Date of Patent: May 7, 1991

[54] MAGENTA DYE-DONOR ELEMENT USED IN THERMAL TRANSFER AND THERMAL TRANSFER SHEET USING IT

[75] Inventors: Yoshiaki Hayashi; Taira Fujita, both of Osaka, Japan

[73] Assignee: Sumitomo Chemical Company, Ltd., Osaka, Japan

[21] Appl. No.: 420,374

[22] Filed: Oct. 12, 1989

[30] Foreign Application Priority Data

Oct. 13, 1988 [JP] Japan .............................. 1-258935
Jul. 19, 1989 [JP] Japan .............................. 63-187644

[51] Int. Cl.[5] .................... B41M 5/035; B41M 5/26; C09D 11/00

[52] U.S. Cl. .................................. 503/227; 8/471; 106/22; 428/195; 428/913; 428/914

[58] Field of Search .................. 8/471; 428/195, 913, 428/914; 503/227; 106/19, 20, 22

[56] References Cited

U.S. PATENT DOCUMENTS

| | | | |
|---|---|---|---|
| 4,052,379 | 10/1977 | Gourley | 260/155 |
| 4,614,521 | 9/1986 | Niwa et al. | 8/471 |
| 4,764,178 | 8/1988 | Gregory et al. | 8/471 |

FOREIGN PATENT DOCUMENTS

| | | | |
|---|---|---|---|
| 0270677 | 6/1988 | European Pat. Off. | 503/227 |
| 0227095 | 7/1988 | European Pat. Off. | 503/227 |
| 60-131293 | 7/1985 | Japan | 503/227 |
| 61-268495 | 11/1986 | Japan | 503/227 |
| 1268495 | 11/1986 | Japan | 503/227 |

*Primary Examiner*—Bruce H. Hess
*Attorney, Agent, or Firm*—Cushman, Darby & Cushman

[57] ABSTRACT

A magenta dye-donor element and a thermal transfer sheet using it which can provide good printed images are disclosed. This magenta dye-donor element comprises a magenta dye dispersed or dissolved in a polymeric binder, said magenta dye comprising a dye represented by the following formula (I):

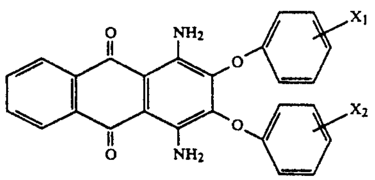

(I)

wherein $X_1$ and $X_2$ each represents a hydrogen atom, a halogen atom, a trifluoromethyl group, a $C_1$–$C_6$ alkyl group or a $C_1$–$C_6$ alkoxy and a dye represented by the following formula (II):

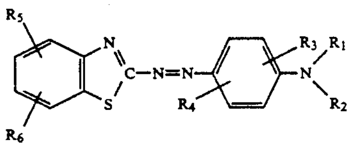

(II)

wherein $R_1$ and $R_2$ each represents a hydrogen atom, a $C_1$–$C_6$ alkyl group, a phenyl group, or a $C_1$–$C_4$ alkyl group substituted with a $C_1$–$C_4$ alkoxy group, a $C_1$–$C_4$ alkoxy-carbonyl group, a $C_1$–$C_4$ alkyl-carbonyloxy group, an aminocarbonyl group, a $C_1$–$C_4$ alkoxy-carbonyloxy group, a cyano group, a phenyl group or a chlorine atom, $R_3$ and $R_4$ each represents a hydrogen atom, a chlorine atom, a $C_1$–$C_6$ alky; group, a $C_1$–$C_4$ alkyl-carbonylamino group, a phenylcarbonylamino group or a $C_1$–$C_4$ alkoxy group, and $R_5$ and $R_6$ each represents a hydrogen atom, a chlorine atom, a bromine atom, a cyano group, a thiocyano group, a nitro group, a $C_1$–$C_6$ alkyl group, or a $C_1$–$C_4$ alkoxy group, a $C_1$–$C_4$ alkylthio group or a $C_1$–$C_4$ alkylsulfonyl group. Preferably the magenta dye contains, in combination with the above two dyes, a dye represented by the following forumla (III):

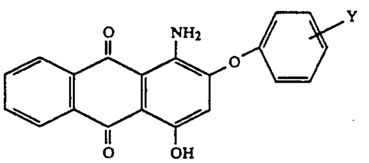

(III)

wherein Y represents a hydrogen atom, a halogen atom, a hydroxy group, a $C_1$–$C_6$ alkyl group or a $C_1$–$C_6$ alkoxy group which may have a substituent.

22 Claims, 5 Drawing Sheets

MAGENTA DYE-DONOR ELEMENT USED IN THERMAL TRANSFER AND THERMAL TRANSFER SHEET USING IT

BACKGROUND OF THE INVENTION

The present invention relates to a magenta dye-donor element used in thermal transfer and a thermal transfer sheet using it.

A method of printing images by thermal transfer, i.e. forming pictures by causing dyes to sublimate or vaporize by heat, has come into the limelight recently as a method for obtaining color hard copies from televisions, CRT color displays, color facsimiles, magnetic cameras, and others. A thermal source in this method includes heating elements such as thermal head and since transfer amount of dye can be controlled according to thermal energy given, good continuous gradation color image can be obtained.

According to this method, sublimating or vaporizing dye coated on a substrate of thermal transfer sheet is transfer printed on an image receiving material by a thermal head controlled by image signal and full color images can be formed by using thermal transfer sheets having dyes of the three primary colors of yellow, magenta and cyan. Such thermal transfer sheet has been produced by selecting dyes having relatively good sublimatability or vaporizability and superior hue and fastness from various dyes such as disperse dyes and basic dyes (e.g., Japanese Patent Kokai Nos. 60-131293 and 61-268495 and U.S. Pat. No. 4,764,178 (Japanese Patent Kokai No. 62-55194)).

Dyes used in thermal transfer sheet must satisfy various requirements as enumerated below and only when these requirements are satisfied, can a good image be obtained.

(1) The dyes must have good solubility and dispersibility of the resin or solvent component, which is used in making thermal transfer sheet by coating dye layer on a transfer substrate.

(2) The dyes must be easily diffused, sublimated or vaporized with heat onto an image receiving material (image printing layer) from a heat transfer sheet, and must have good affinity for a resin of image receiving material.

(3) The dyes must have optimum color characteristics, namely, hue, density and chroma as three primary colors for full color display in image printing layer.

(4) The dyes must afford images with excellent fastness, including light resistance and migration resistance.

Various proposals have been made to satisfy the requirements for dyes and, for example, it has been proposed to use dyes having specific chemical structure or dyes having limited molecular weight and I/O value.

However, satisfactory dyes have not yet been obtained. Especially, magenta dyes are problematic in that they are inferior in solubility in making thermal transfer sheet and they cannot give magenta color having desired hue.

SUMMARY OF THE INVENTION

The inventors have conducted intensive research for obtaining magenta dye-donor elements which can satisfy the above-mentioned requirements and thermal transfer sheet using these elements and as a result have found that the above object can be attained by using specific two or more dyes in combination.

DESCRIPTION OF THE INVENTION

Figure 1:
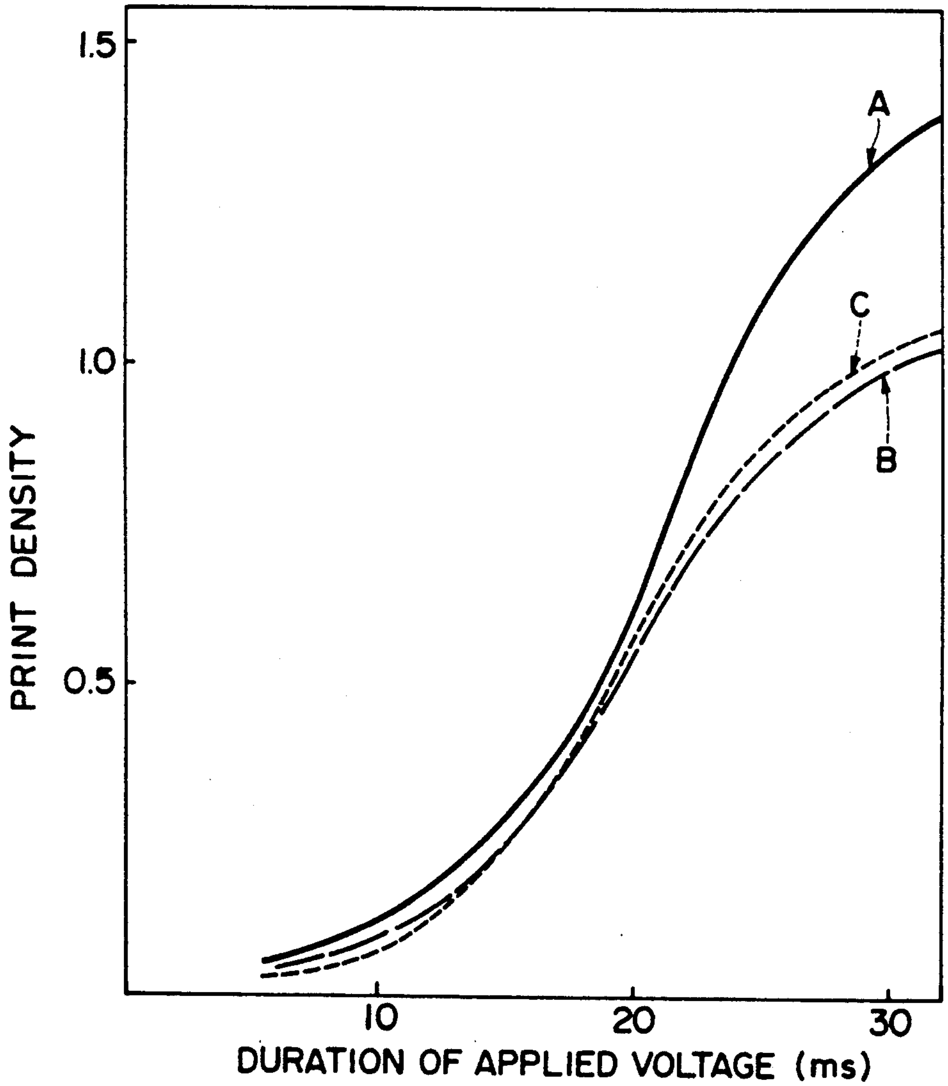
FIG. 1 is a graph which shows a correlation between the duration of applied thermal energy and printing density, wherein data A, B and C indicate differences when the transfer sheets obtained in Example 1, Comparative Example 1 and Comparative Example 2 were used, respectively.
Figure 2A:
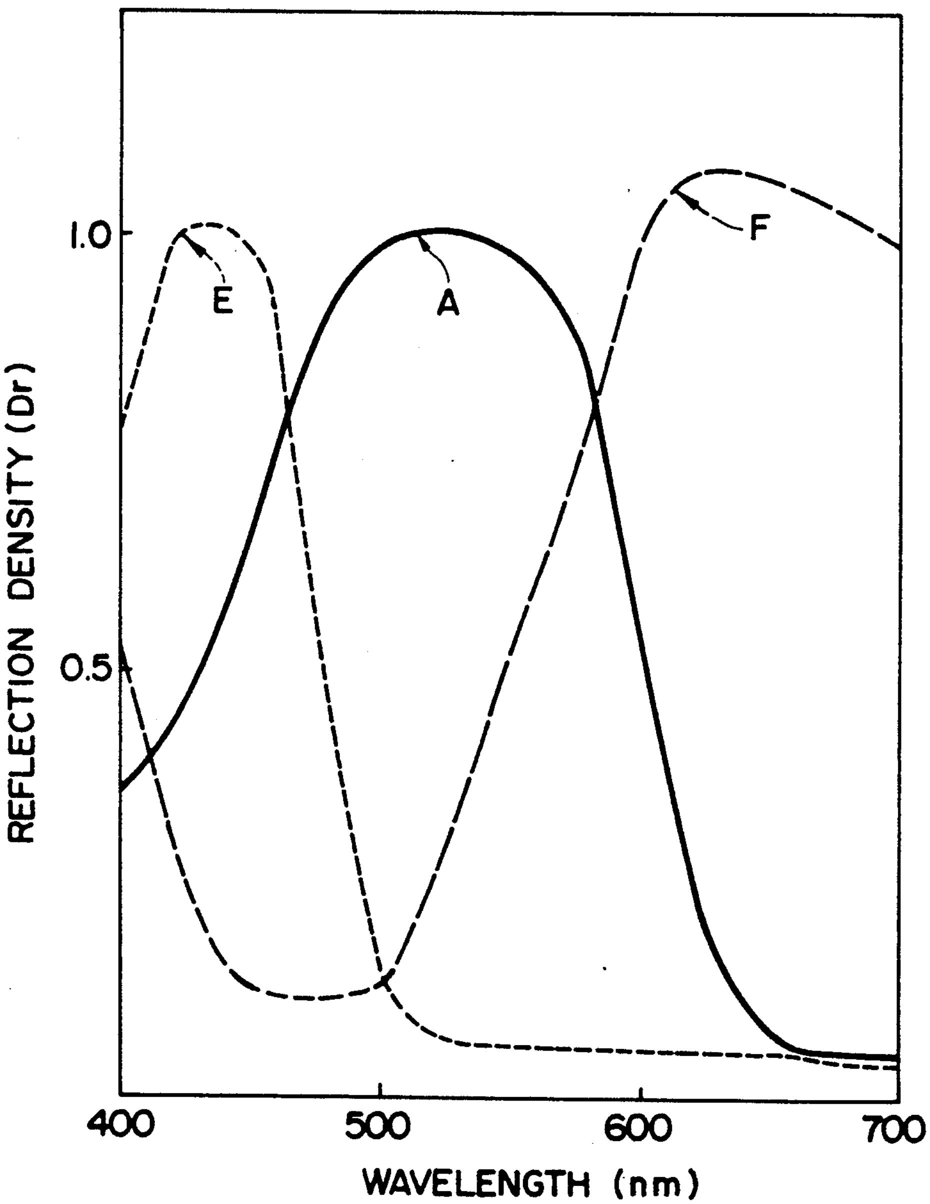
FIGS. 2*a* and 2*b* are graphs which show change of spectral reflection density in visible light region wherein data A, E and F in FIG. 2*a* show the changes in Example 1, Reference Example 1 and Reference Example 2 and data D, E and F in FIG. 2*b* show the changes in Comparative Example 3, Reference Example 1 and Reference Example 2, respectively.
Figure 2B:
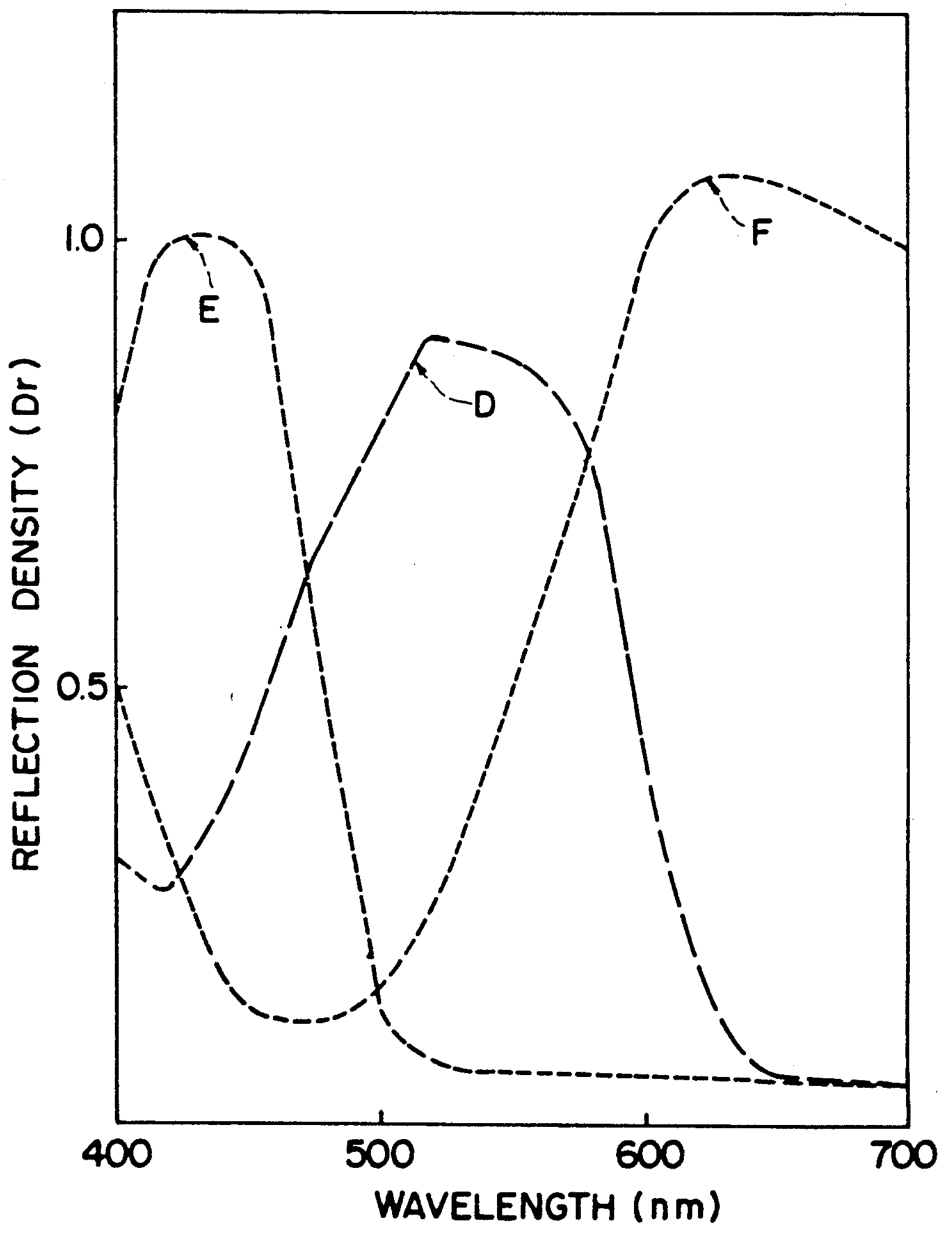

The present invention provides a magenta dye-donor element for thermal transfer which comprises magenta dye dispersed or dissolved in a polymeric binder, characterized in that the magenta dye is a mixture of a dye represented by the following formula (I):

(I)

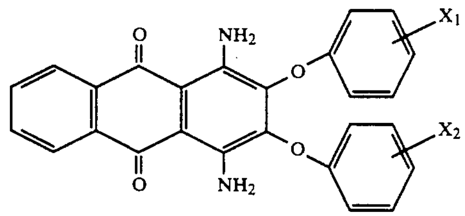

(wherein $X_1$ and $X_2$ each represents a hydrogen atom, a halogen atom, a trifluoromethyl group, a $C_1$–$C_6$ alkyl group or a $C_1$–$C_6$ alkoxy group) and a dye represented by the following formula (II):

(II)

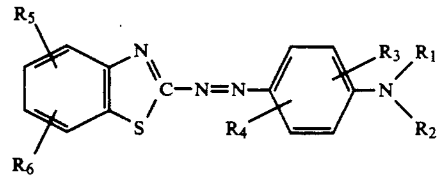

(wherein $R_1$ and $R_2$ each represents a hydrogen atom, a $C_1$–$C_6$ alkyl group, a phenyl group, or a $C_1$–$C_4$ alkyl group substituted with a substituent selected from a $C_1$–$C_4$ alkoxy group, a $C_1$–$C_4$ alkoxycarbonyl group, a $C_1$–$C_4$ alkyl-carbonyloxy group, aminocarbonyl group, a $C_1$–$C_4$ alkoxy-carbonyloxy group, cyano group, phenyl group and chlorine atom, $R_3$ and $R_4$ each represents a hydrogen atom, a chlorine atom, a $C_1$–$C_6$ alkyl group, a $C_1$–$C_4$ alkyl-carbonylamino group, a phenylcarbonylamino group or a $C_1$–$C_4$ alkoxy group, and $R_5$ and $R_6$ each represents a hydrogen atom, a chlorine atom, a bromine atom, a cyano group, a thiocyano group, a nitro group, a $C_1$–$C_6$ alkyl group, a $C_1$–$C_4$ alkoxy group, a $C_1$–$C_4$ alkylthio group or a $C_1$–$C_4$ alkylsulfonyl group) or a mixture of the above dyes (I) and (II) and additionally a dye represented by the following formula (III):

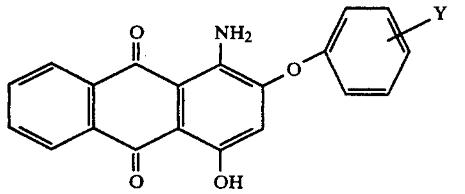
(III)

(wherein Y represents a hydrogen atom, a halogen atom, a hydroxy group, a $C_1$–$C_6$ alkyl group or a $C_1$–$C_6$ alkoxy group which may have a substituent). The present invention further provides a heat transfer sheet using the above magenta dye-donor element.

The dye represented by the formula (I) alone has color similar to the desired magenta color, but is not sufficient in solubility at preparation of transfer sheet. On the other hand, the dye represented by the formula (II) alone has color fairly close to yellow as compared with the desired magenta color and besides is insufficient in solubility and transferability at preparation of transfer sheet. Furthermore, the dye represented by the formula (III) alone has color which is much different from the desired magenta color.

It has been found that the desired magenta color can be obtained and furthermore solubility and transfer characteristics can be considerably improved and thus the above problems can be all solved by using the dyes represented by the formulas (I) and (II) in combination or these dyes in further combination with the dye represented by the formula (III).

Especially preferred $X_1$ and $X_2$ in the formula (I) include hydrogen atom, chlorine atom, bromine atom, methyl group, ethyl group, methoxy group and ethoxy group.

Preferred $R_1$ and $R_2$ in the formula (II) include $C_1$–$C_6$ alkyl group, phenyl group or $C_1$–$C_4$ alkyl group substituted with a substituent selected from $C_1$–$C_4$ alkoxy group, $C_1$–$C_4$ alkoxycarbonyl group, $C_1$–$C_4$ alkylcarbonyloxy group, aminocarbonyl group, $C_1$–$C_4$ alkoxy-carbonyloxy group, cyano group, phenyl group and chlorine atom. $R_3$ and $R_4$ in the formula (II) are hydrogen atom, chlorine atom, $C_1$–$C_6$ alkyl group, $C_1$–$C_4$ alkylcarbonylamino group, phenylcarbonylamino group or $C_1$–$C_4$ alkoxy group. $R_4$ and $R_6$ are hydrogen atom, chlorine atom, bromine atom, cyano group, thiocyano group, nitro group, $C_1$–$C_6$ alkyl group, $C_1$–$C_4$ alkoxy group, $C_1$–$C_4$ alkylthio group or $C_1$–$C_4$ alkylsulfonyl group.

Specific examples of substituents represented by Y in the formula (III) are halogen atoms such as fluorine atom and chlorine atom, hydroxy group, and alkyl and alkoxy groups of 1–6 carbon atoms such as methyl, ethyl, propyl, butyl, benzyl, methoxy, ethoxy, and ethoxyethoxy groups.

The compounds represented by the formula (I) include known compounds and can be easily produced by the method known per se, for example, by allowing a compound represented by the following formula (1):

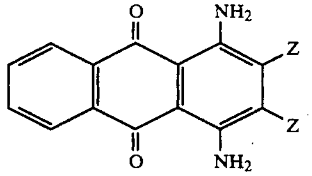
(1)

(wherein Z represents a chlorine atom or a bromine atom) to react with a compound represented by the following formula (2) or (3):

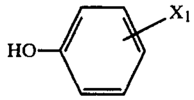
(2) or
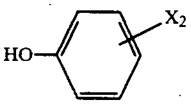
(3)

(wherein $X_1$ and $X_2$ have the same meanings as defined above).

The compounds represented by the formula (II) also include known compounds and can be produced by the method known per se, for example, by diazotizing a compound represented by the following formula (4):

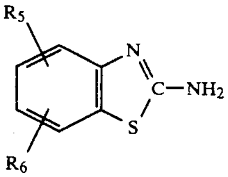
(4)

(wherein $R_5$ and $R_6$ have the same meanings as defined above) and then subjecting the diazotized compound to coupling reaction with a compound represented by the following formula (5):

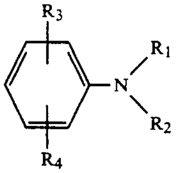
(5)

(wherein $R_1$, $R_2$, $R_3$, and $R_4$ have the same meanings as defined above).

Furthermore, the compound represented by the formula (III) can also be produced by known method, for example, by allowing 1-amino-2-bromo-4-hydroxyanthraquinone to react with a compound represented by the formula (6):

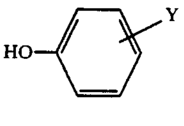
(6)

(wherein Y has the same meaning as defined above) or by allowing a compound represented by the formula (7):

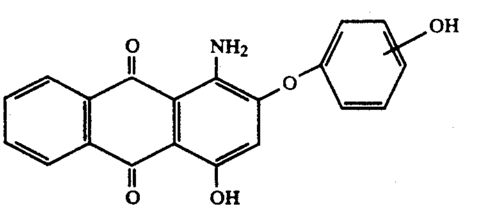
(7)

to react with a corresponding reagent.

The transfer sheet prepared by using the magenta dye-donor element of the present invention is characterized by containing at least one magenta dye represented by the formula (I) and at least one magenta dye represented by the formula (II) and preferably additionally a magenta dye represented by the formula (III). The blending ratio of these dyes is preferably 10–60% by weight of the dye of the formula (I), 90–40% by weight of the dye of the formula (II) and 0–60% by weight (based on the total amount of the dyes of the formulas (I), (II) and (III)) of the dye of the formula (III). More preferably, amount of the dye of the formula (III) is 10–50% by weight. If necessary, this dye mixture may further contain other dyes.

Dyes represented by the formulas (I) and (II) or (I), (II) and (III) are previously mixed and the mixture is dispersed or dissolved in a suitable polymeric binder and, if necessary, in other solvent or these dyes are dispersed or dissolved in succession in the polymeric binder and, if necessary, in solvent, thereby to prepare an ink and this ink is coated on one side of a substrate and dried to form a magenta dye carrying layer. Thus, a thermal transfer sheet is obtained.

The substrate includes, for example, capacitor paper, cellophane, polyimide resin, polyester resin, and polyether sulfon resin.

This substrate is preferably in the form of a ribbon or film, on one side of which is formed a magenta dye carrying layer and another side of which is subjected to treatments for improvement of heat resistance and/or improvement of smoothness.

Ink is prepared by carrying out dissolution or dispersion, in a ball mill or paint conditioner, of dyes represented by the formulas (I) and (II) or (I), (II) and (III) in a polymeric binder and a solvent, if necessary, together with other known additives (such as anti-tack agent, antioxidant and ultraviolet absorber).

As examples of the binder, mention may be made of natural resins such as gum dammar, gum arabic, gum tragacanth, dextrin and casein, and their modified resins; cellulose resins such as methylcellulose, ethylcellulose, hydroxyethylcellulose, ethylhydroxycellulose, ethylhydroxyethylcellulose and nitrocellulose; acrylic resins; vinyl resins such as polyvinyl alcohol and polyvinyl acetate. These may be used alone or in combination of two or more.

As examples of the solvent, mention may be made of water; alcohols such as ethanol, propanol and butanol; ketones such as acetone, methyl ethyl ketone and methyl isobutyl ketone; aromatic hydrocarbons such as toluene, xylene and monochlorobenzene; chlorinated solvents such as dichloroethane, trichloroethylene and perchloroethylene; and acetate esters such as ethyl acetate, butyl acetate and ethoxyethyl acetate. These may be used alone or in combination of two or more.

A dye ink obtained is coated on a substrate by bar coater, roll coater, knife coater, screen printer, gravure printer or the like and thus a thermal transfer sheet is obtained.

Printing with the resulting thermal transfer sheet can be conducted by any known methods and a clear image can be obtained on a printing paper.

The printing paper includes, for example, polyester resin- or polyamide resin-coated papers, synthetic papers such as polypropylene, polyvinyl chloride and polyester, and these synthetic papers which are subjected to treatment for improvement of heat resistance and then, if necessary, coated with polyester resin, polyamide resin or the like which are high in affinity for dyes.

The thermal transfer sheet obtained by using the mixed dyes according to the present invention has the following effects superior to those of thermal transfer sheet made by using conventional dyes.

(1) Solubility or dispersibility of dye in resin film of the transfer sheet is excellent and hence good transferability is exhibited at transfer to an image receiving sheet by a thermal head.

(2) The dyes are excellent in heat diffusibility, vaporizability or sublimatability onto an image receiving sheet from the thermal transfer sheet.

(3) The image printing layer obtained by thermal transfer has hue, density and chroma excellent especially as magenta among three primary colors.

(4) The thermal transfer sheet is excellent in fastnesses such as light resistance and migration resistance.

(5) The thermal transfer sheet is excellent in storage stability and besides shows little blotting of dye in image printing layer and excellent pattern reproducibility.

The present invention will be explained in more detail by the following examples in which "part" is by weight.

EXAMPLE 1

(i) Preparation of ink:

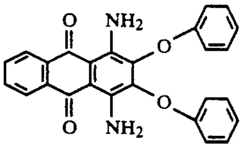
(I-1)

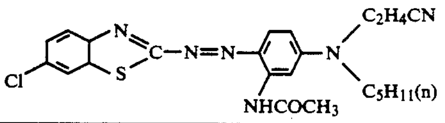
(II-1)

| | |
|---|---|
| Ethylcellulose | 6.0 parts |
| Dye of the above formula (I-1) | 1.2 parts |
| Dye of the above formula (II-1) | 0.8 part |
| Toluene | 46 parts |
| Methyl ethyl ketone | 46 parts |
| Total | 100 parts |

A mixture of the above composition was sufficiently kneaded in a paint conditioner with glass beads to prepare an ink.

(ii) Production of thermal transfer sheet:

The ink prepared in the above (i) was coated at a wet thickness of 12 μm on a polyester film of 6 μm thick which had been subjected to heat resisting treatment by a bar coater and was dried at 80° C. by a hot-air drier to obtain a thermal transfer sheet. This transfer sheet had good condition with no crystallization of dye.

(iii) Production of image receiving sheet:

A synthetic paper (YUPO #150 manufactured by Oji Yuka Co.) was coated with a 20 wt % solution of a saturated polyester resin (BYRON 200 manufactured by Toyobo Co., Ltd.) in toluene/methyl ethyl ketone at a wet thickness of 12 μm by a bar coater, followed by drying at 80° C. for 30 minutes by a hot-air drier.

(iv) Transfer printing:

The above thermal transfer sheet was put on the above image receiving sheet so that the surface of ink layer on the thermal transfer sheet and the surface of coating layer on the image receiving sheet were brought into close contact with each other and thermal transfer printing was carried out using a heat-sensitive head (8 volts, 31 milliseconds) having 200 ohm heating resistor in 4 dots/mm density.

(v) Evaluation of properties of printed image:

(1) Color density: This was measured by densitometer RD-914 (manufactured by Macbeth Co.) and the results are shown in FIG. 1 (mark: A).

(2) Spectral reflection density: Reflectance of the image was measured by a spectral reflectance measuring device: SICOMUC 20 (manufactured by Sumika Analysis Center) and reflection density Dr at respective visible wavelengths was calculated from the obtained reflectance R by the following formula and the results are shown in FIG. *2a* (mark: A).

Reflection density $Dr = \log_{10}(100/R)$ (3) Light resistance: The image was subjected to irradiation by carbon arc fadeometer CF-20S (manufactured by Shimadzu Seisakusho, Ltd.) for 40 hours to find substantially no discoloration.

(4) Migration resistance: A white paper was superposed on the printed image and this was left to stand in conditions of temperature 60° C. and humidity 80% for 3 days, but substantially no migration of the image to the white paper was recognized.

COMPARATIVE EXAMPLES 1 AND 2

Dye inks having the following composition were prepared in the same manner as in Example 1 except that single dye was used in place of the dye mixture.

| | Comparative Example 1 | Comparative Example 2 |
|---|---|---|
| Ethylcellulose | 6 parts | 6 parts |
| Dye of (I-1) | 2 parts | 0 part |
| Dye of (II-1) | 0 part | 2 parts |
| Toluene | 46 parts | 46 parts |
| Methyl ethyl ketone | 46 parts | 46 parts |
| Total | 100 parts | 100 parts |

Then, production of thermal transfer sheet, transfer printing, and evaluation of printed image were conducted in the same manner as in Example 1 and the results are shown in FIG. 1 as comparative examples [mark: B ( Comparative Example 1), mark: C (Comparative Example 2)].

COMPARATIVE EXAMPLE 3

(i) Preparation of ink:

(I-1)

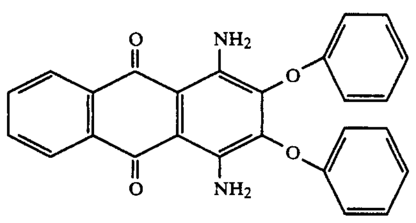

(III-1)

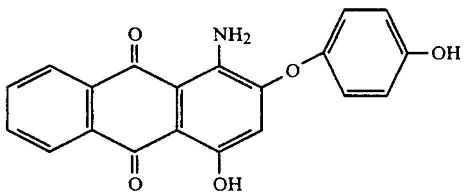

| | | |
|---|---|---|
| Ethylcellulose | | 6.0 parts |
| Dye of the above formula (I-1) | | 1.2 parts |
| Dye of the above formula (III-1) | | 0.8 part |
| Toluene | | 46 parts |
| Methyl ethyl ketone | | 46 parts |
| | Total | 100 parts |

A mixture of the above composition was sufficiently kneaded in a paint conditioner using glass beads to obtain an ink. Then, in the same manner as in Example 1, production of thermal transfer sheet, transfer printing, and evaluation of properties of printed image were carried out and the results are shown in FIG. *2b* as comparative example [mark: D (Comparative Example 3)].

REFERENCE EXAMPLE 1 AND 2

Using inks of the following compositions for yellow and cyan (Reference Examples 1 and 2), production of thermal transfer sheet, transfer printing and evaluation of printed image were conducted in the same manner as in Example 1 and the results are shown in FIGS. *2a* and *2b* [mark: E (Reference Example 1), F (Reference Example 2)]together with the properties of magenta color as full color obtained in Example 1 and Comparative Example 3.

| | Reference Example 1 | Reference Example 2 |
|---|---|---|
| Ethylcellulose | 6 parts | 6 parts |
| 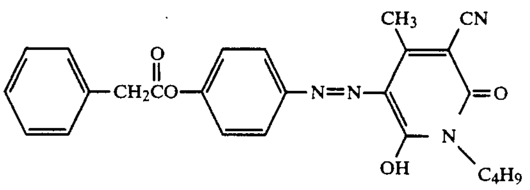 | 2 parts | 0 part |

-continued

| | | Reference Example 1 | Reference Example 2 |
|---|---|---|---|
| 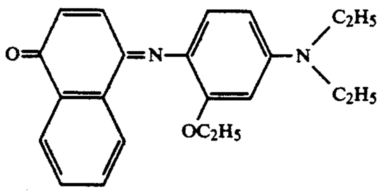 | | 0 part | 2 parts |
| Toluene | | 46 parts | 46 parts |
| Methyl ethyl ketone | | 46 parts | 46 parts |
| | Total | 100 parts | 100 parts |

Furthermore, continuous transfer printing was carried out under the same transfer printing conditions as in Example 1 using the transfer sheet of Reference Example 1, that of Example 1 and that of Reference Example 2 in succession, thereby to obtain black color. Further, continuous transfer printing was carried out under the same transfer printing conditions as in Example 1 using the transfer sheet of Reference Example 1, that of Comparative Example 3 and that of Reference Example 2 in succession, thereby to obtain black color. These black colors were compared in FIG. 3.

It is clear that use of the magenta color obtained by the present invention yielded black color of higher blackness.

EXAMPLE 2

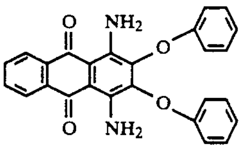

(I-1)

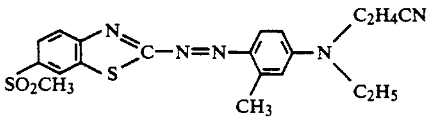

(II-2)

| | |
|---|---|
| Ethylhydroxyethylcellulose | 6.0 parts |
| Dye of the above formula (I-1) | 1.0 parts |
| Dye of the above formula (II-2) | 1.0 part |
| Toluene | 46.0 parts |
| Methyl ethyl ketone | 46.0 parts |
| Total | 100 parts |

A mixture of the above composition was sufficiently kneaded in a paint conditioner using glass beads to obtain an ink. Then, in the same manner as in Example 1, production of termal transfer sheet, transfer printing, and evaluation of properties of printed image were carried out to obtain good results as in Example 1.

EXAMPLE 3

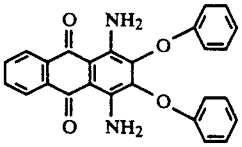

(I-1)

-continued

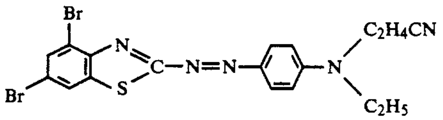

(II-3)

| | |
|---|---|
| Ethylcellulose | 6.0 parts |
| Dye of the above formula (I-1) | 0.8 part |
| Dye of the above formula (II-3) | 1.2 parts |
| Toluene | 46.0 parts |
| Methyl ethyl ketone | 46.0 parts |
| Total | 100 parts |

A mixture of the above composition was sufficiently kneaded in a paint conditioner using glass beads to obtain an ink. Then, in the same manner as in Example 1, production of thermal transfer sheet, transfer printing, and evaluation of properties of printed image were carried out to obtain good results a in Example 1.

EXAMPLE 4

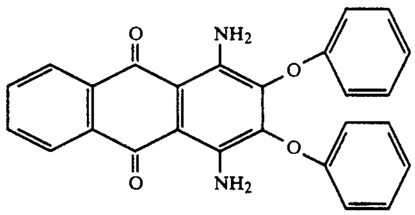

(I-1)

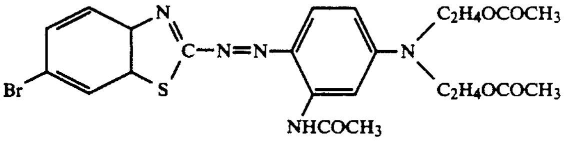

(II-4)

| | |
|---|---|
| Ethylhydroxyethylcellulose | 6.0 parts |
| Dye of the above formula (II-1) | 1.2 parts |
| Dye of the above formula (II-4) | 0.8 part |
| Toluene | 46.0 parts |
| Methyl ethyl ketone | 46.0 parts |
| Total | 100 parts |

A mixture of the above composition was sufficiently kneaded in a paint conditioner using glass beads to obtain an ink. Then, in the same manner as in Example 1, production of thermal transfer sheet, transfer printing, and evaluation of properties of printed image were carried out to obtain good results as in Example 1.

EXAMPLE 5

(I-1)
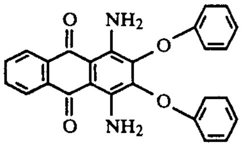
(II-1)
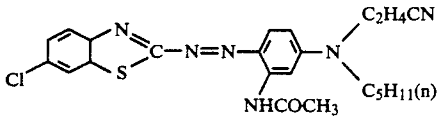
(III-1)
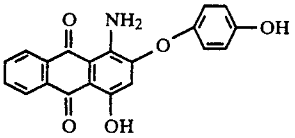

| | |
|---|---|
| Ethylcellulose | 6.0 parts |
| Dye of the above formula (I-1) | 0.4 part |
| Dye of the above formula (II-1) | 0.6 part |
| Dye of the above formula (III-1) | 1.0 part |
| Toluene | 46 parts |
| Methyl ethyl ketone | 46 parts |
| Total | 100 parts |

Figure 4:
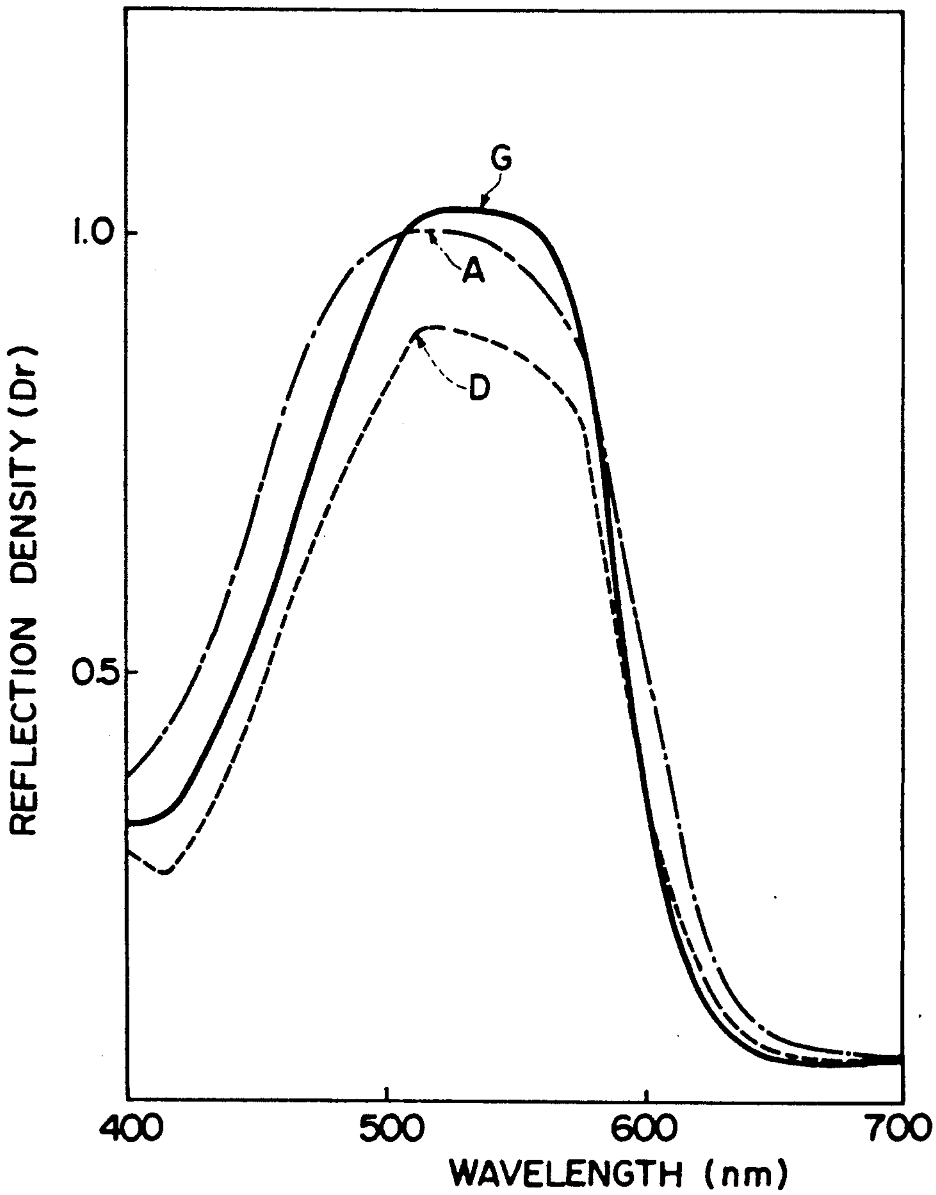
FIG. 4 is a graph which shows change of spectral reflection density of magenta color and this shows that the mixture of three dyes in Example 5 is preferred to A (Example 1) and D(Example 3).

A mixture of the above composition was sufficiently kneaded in a paint conditioner using glass beads to obtain an ink. Then, in the same manner as in Example 1, production of thermal transfer sheet, transfer printing, and evaluation of properties of printed image were carried out and the results are shown in FIG. 4 (mark: G).

EXAMPLE 6

Production of thermal transfer sheet, transfer printing and evaluation of properties of printed image were conducted in the same manner as in Example 5 except that a dye represented by the following formula (III-2) was used in place of the dye of the formula (III-1).

(III-2)
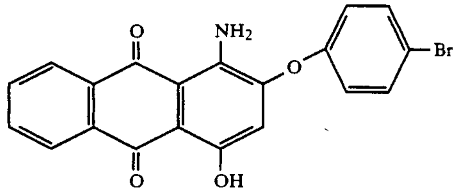

EXAMPLE 7

Production of thermal transfer sheet, transfer printing and evaluation of properties of printed image were conducted in the same manner as in Example 5 except that a dye represented by the following formula (III-3) was used in place of the dye represented by the formula (III-1).

(III-3)
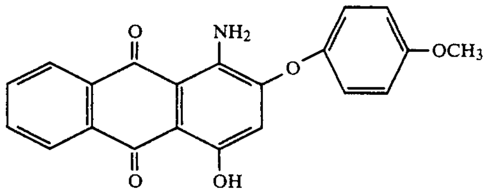

EXAMPLES 8-16

Thermal transfer sheets were prepared using dyes having the compositions as shown in Tables 1 and 2 and thermal transfer printing and evaluation of properties of the printed image were conducted in the same manner as in Example 1. The results are shown in Table 3.

TABLE 1

| Example No. | Dye of the formula (I) | (Amount) (Part) | Dye of the formula (II) | (Amount) (Part) |
|---|---|---|---|---|
| 8 | I-1 | 0.95 | 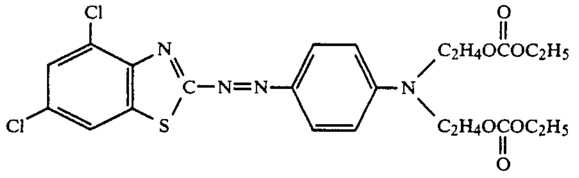 | 1.05 |
| 9 | " | 1.6 | 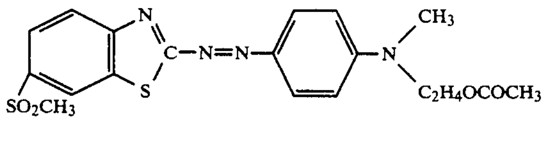 | 0.4 |
| 10 | " | 1.05 | 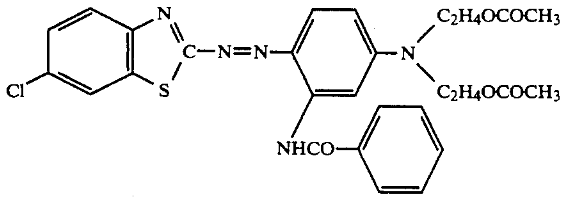 | 0.95 |
| 11 | " | 0.8 | 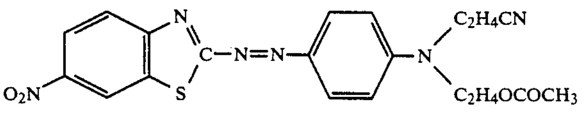 | 1.2 |

TABLE 1-continued

| Example No. | Dye of the formula (I) | (Amount) (Part) | Dye of the formula (II) | (Amount) (Part) |
|---|---|---|---|---|
| 12 | " | 1.0 | 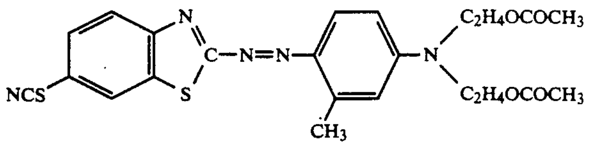 | 1.0 |

TABLE 2

| Example No. | Dye of the formula (I) | (Amount) (Part) | Dye of the formula (II) | (Amount) (Part) |
|---|---|---|---|---|
| 13 | I-1 | 1.2 | 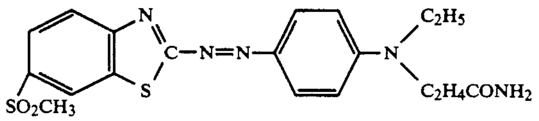 | 0.8 |
| 14 | " | 0.85 | 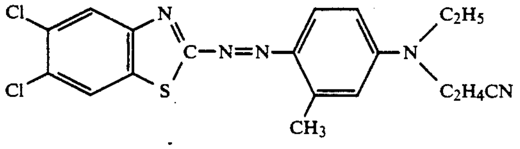 | 1.15 |
| 15 | " | 0.9 | 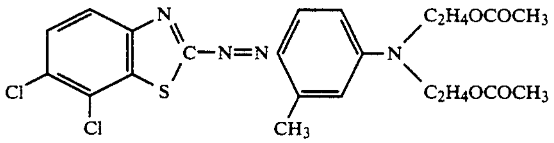 | 1.1 |
| 16 | " | 1.6 | 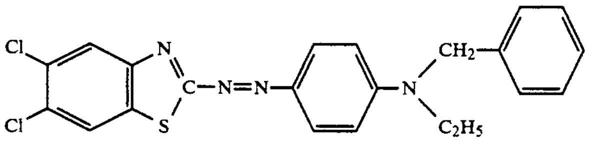 | 0.4 |

TABLE 3

| | State of transfer sheet | Printed image: Maximum print density | Printed image: Color as full color* |
|---|---|---|---|
| Example | | | |
| 1 | Good | 1.36 | O |
| 2 | " | 1.28 | O |
| 3 | " | 1.30 | O |
| 4 | " | 1.33 | O |
| 5 | " | 1.40 | O |
| 6 | " | 1.35 | O |
| 7 | " | 1.37 | O |
| 8 | " | 1.24 | O |
| 9 | " | 1.25 | O |
| 10 | " | 1.33 | O |
| 11 | " | 1.27 | O |
| 12 | " | 1.35 | O |
| 13 | " | 1.28 | O |
| 14 | " | 1.24 | O |
| 15 | " | 1.23 | O |
| 16 | " | 1.25 | O |
| Comparative Example | | | |
| 1 | Crystal isolated | 1.01 | X |
| 2 | coarse dispersion particles | 1.05 | X |

TABLE 3-continued

| | State of transfer sheet | Printed image: Maximum print density | Printed image: Color as full color* |
|---|---|---|---|
| 3 | Good | 1.06 | Δ |

Figure 3:
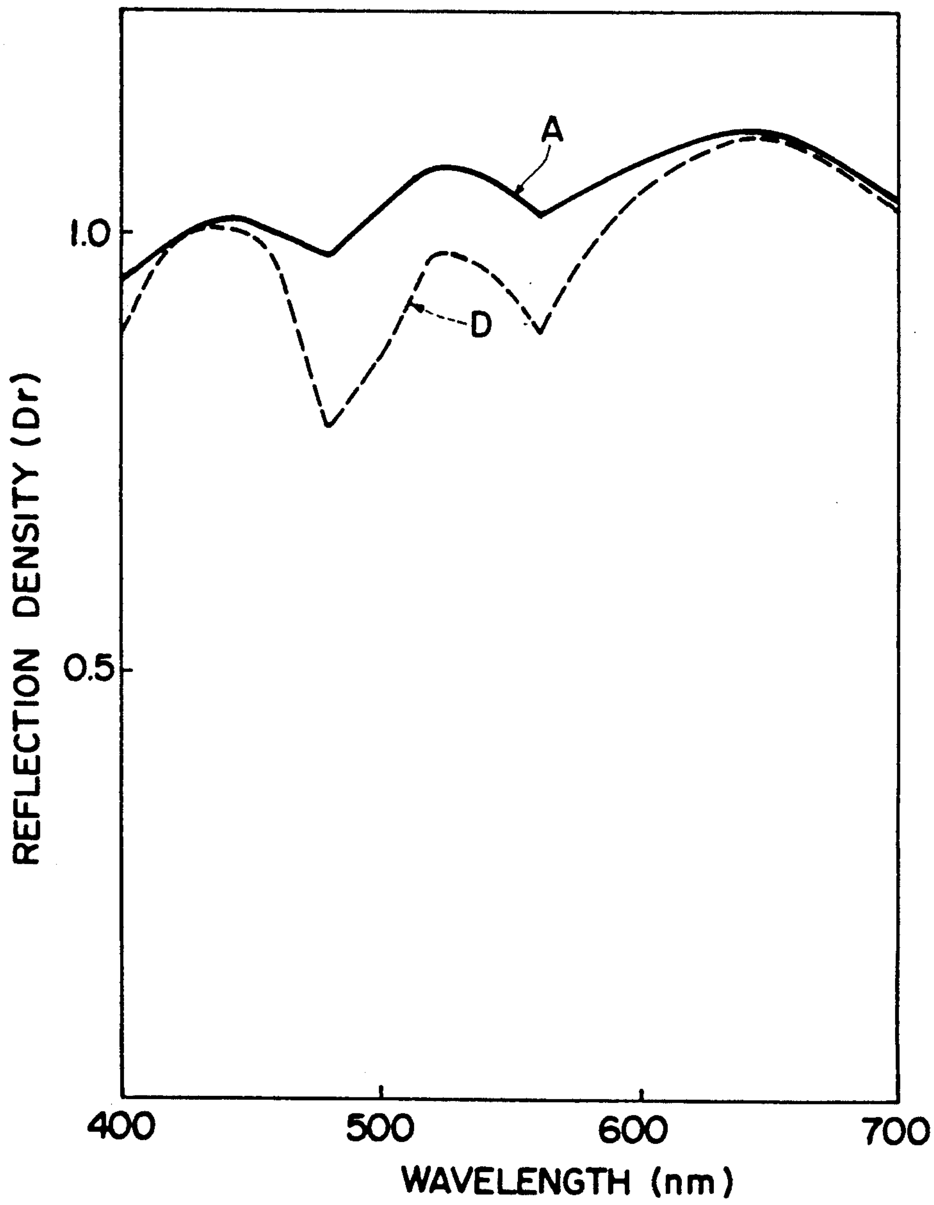
FIG. 3 is a graph which shows change of spectral reflection density of black in visible light region wherein A and D show performance of black and magenta obtained in Example 1 and Comparative Example 3 as changes of spectral reflection density in visible light region by using yellow and cyan transfer sheets of Reference Example 1 and Reference Example 2.

*In Table 3, marks O, Δ and X show level of blackness when magenta color is used as an element of full color, i.e., highly deep, deep and a little deep, respectively. FIG. 3 is one of example of the level, in which the smaller uneveness in curve is, the deeper blackness is.

What is claimed is:

1. A magenta dye composition for thermal transfer which comprises a magenta dye dispersed or dissolved in a polymeric binder, said magenta dye comprising a dye represented by the following formula (I):

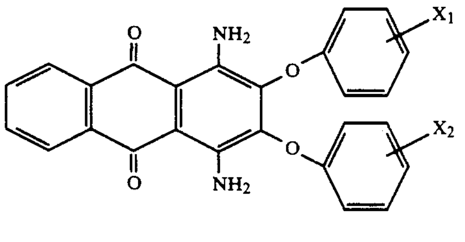

(I)

wherein $X_1$ and $X_2$ each represents a hydrogen atom, a halogen atom, a trifluoromethyl group, a $C_1$–$C_6$ alkyl group or a $C_1$–$C_6$ alkoxy group and a dye represented by the following formula (II):

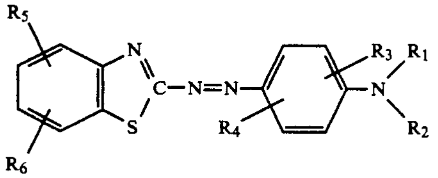

(II)

wherein $R_1$ and $R_2$ each represents a hydrogen atom, a $C_1$–$C_6$ alkyl group, a phenyl group or a $C_1$–$C_4$ alkyl group substituted with a $C_1$–$C_4$ alkoxy group, a $C_1$–$C_4$ alkoxy-carbonyl group, a $C_1$–$C_4$ alkyl-carbonyloxy group, an aminocarbonyl group, a $C_1$–$C_4$ alkoxy-carbonyloxy group, a cyano group, a phenyl group or a chlorine atom, $R_3$ and $R_4$ each represents a hydrogen atom, a chlorine atom, a $C_1$–$C_6$ alkyl group, A $C_1$–$C_4$ alkyl-carbonylamino group, a phenylcarbonylamino group or a $C_1$–$C_4$ alkoxy group, and $R_5$–$R_6$ each represents a hydrogen atom, a chlorine atom, a bromine atom, a cyano group, a thiocyano group, a nitro group, a $C_1$–$C_6$ alkyl group, a $C_1$–$C_4$ alkoxy group, a $C_1$–$C_4$ alkylthio group or a $C_1$–$C_4$ alkylsulfonyl group.

2. A magenta dye composition for thermal transfer which comprises a magenta dye dispersed or dissolved in a polymeric binder, said magenta dye comprising a dye represented by the following formula (I):

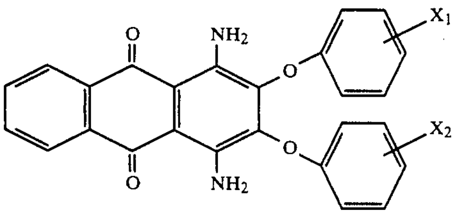

(I)

wherein $X_1$ and $X_2$ each has the same meaning as defined above, a dye represented by the following formula (II):

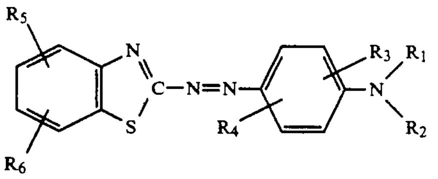

(II)

wherein $R_1$–$R_6$ each has the same meaning as defined above, and a dye represented by the following formula (III):

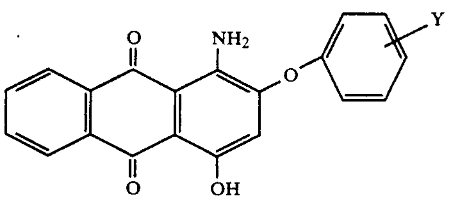

(III)

wherein Y represents a hydrogen atom, a halogen atom, a hydroxy group, a $C_1$–$C_6$ alkyl group or a $C_1$–$C_6$ alkoxy group which may have a substituent.

3. A magenta dye-composition according to claim 2, wherein the magenta dye comprises 10–60% by weight of the dye represented by the formula (I), 90–40% by weight of the dye represented by the formula (II) and 0–60% by weight of the dye represented by the formula (III) based on the total of the dyes represented by the formulas (I), (II) and (III).

4. A magenta dye-composition according to claim 3, wherein content of the dye represented by the formula (III) is 10–50% by weight.

5. A magenta dye-composition according to claim 1 or 2, wherein the dye represented by the formula (I) has the following formula (IV):

(IV)

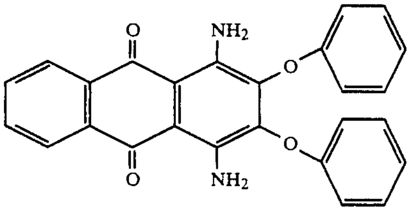

6. A magenta dye composition according to claim 1 or 2, wherein the dye represented by the formula (II) has the following formula (V):

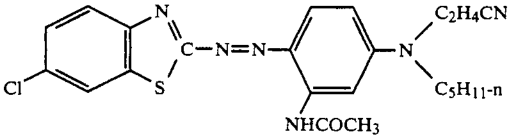

(V)

7. A magenta dye composition according to claim 2, wherein the dye represented by the formula (III) has the following formula (VI):

(VI)

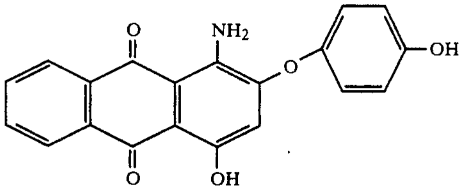

8. A magenta dye composition according to claim 2, wherein the dye represented by the formula (III) has the following formula (VII):

(VII)

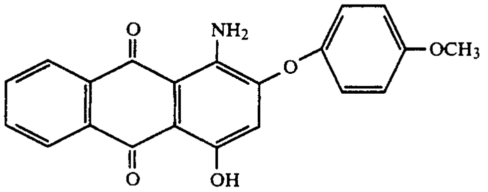

9. A magenta dye composition for thermal transfer which comprises a magenta dye dispersed or dissolved in a polymeric binder, said magenta dye comprising a dye represented by the following formula (IV):

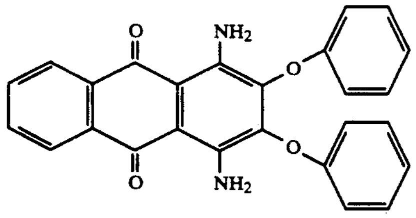

(IV)

a dye represented by the following formula (V):

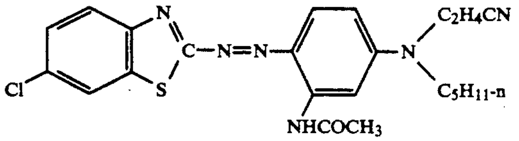

(V)

and a dye represented by the following formula (VI):

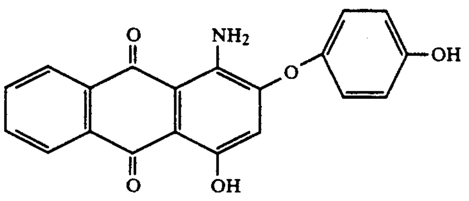

(VI)

10. A magenta dye composition according to claim 9, wherein the magenta dye comprises 10–60% by weight of the dye represented by the formula (IV), 90–40% by weight of the dye represented by the formula (V) and 0–60% by weight of the dye represented by the formula (VI) based on the total of the dyes represented by the formulas (IV), (V) and (VI).

11. A magenta dye composition according to claim 10, wherein content of the dye represented by the formula (VI) is 10–50% by weight.

12. A magenta dye composition for thermal transfer which comprises a magenta dye dispersed or dissolved in a polymeric binder, said magenta dye comprising a dye represented by the following formula (IV):

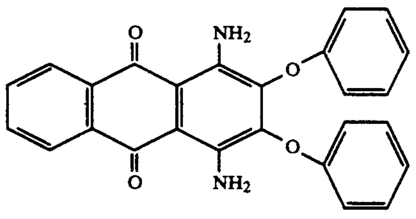

(IV)

a dye represented by the following formula (V):

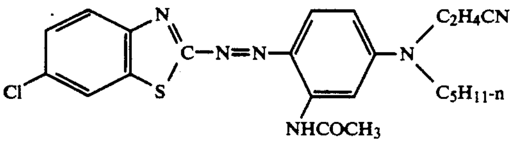

(V)

and a dye represented by the following formula (VII):

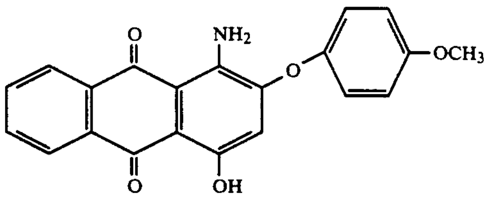

(VII)

13. A magenta dye composition according to claim 12, wherein the magenta dye comprises 10–60% by weight of the dye represented by the formula (IV), 90–40% by weight of the dye represented by the formula (V) and 0–60% by weight of the dye represented by the formula (VII) based on the total of the dyes represented by the formulas (IV), (V) and (VII).

14. A magenta dye composition according to claim 13, wherein content of the dye represented by the formula (VII) is 10–50% by weight.

15. A thermal transfer sheet which comprises a substrate sheet and a magenta dye-donor element layer comprising a magenta dye dispersed or dissolved in a polymeric binder provided on one side of the substrate sheet, said magenta dye comprising a dye represented by the following formula (I):

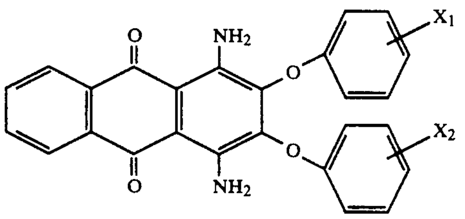

(I)

wherein $X_1$ and $X_2$ each represents a hydrogen atom, a halogen atom, a trifluoromethyl group, a $C_1$–$C_6$ alkyl group or a $C_1$–$C_6$ alkoxy group dye represented by the following formula (II):

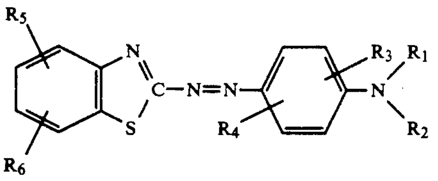

(II)

wherein $R_1$ and $R_2$ each represents a hydrogen atom, a $C_1$–$C_6$ alkyl group, a phenyl group, or a $C_1$–$C_4$ alkyl group substituted with a $C_1$–$C_4$ alkoxy group, a $C_1$–$C_4$ alkoxy-carbonyl group, a $C_1$–$C_4$ alkyl-carbonyloxy group, an aminocarbonyl group, a $C_1$–$C_4$ alkoxy-carbonyloxy group, a cyano group, a phenyl group or a chlorine atom, $R_3$ and $R_4$ each represents a hydrogen atom, a chlorine atom, a $C_1$–$C_6$ alkyl group, a $C_1$–$C_4$ alkyl-carbonylamino group, a phenylcarbonylamino group or a $C_1$–$C_4$ alkoxy group, and $R_5$ and $R_6$ each represents a hydrogen atom, a chlorine atom, a bromine atom, a cyano group, a thiocyano group, a nitro group, a $C_1$–$C_6$ alkyl group, a $C_1$–$C_4$ alkoxy group, a $C_1$–$C_4$ alkylthio group or a $C_1$–$C_4$ alkylsulfonyl group.

16. A thermal transfer sheet according to claim 15, wherein the dye comprises 10–60% by weight of the dye represented by the formula (I) and 90–40% by weight of the dye represented by the formula (II).

17. A thermal transfer sheet which comprises a substrate sheet and, provided on one side thereof, a magenta dye-donor element layer comprising a magenta dye dispersed or dissolved in a polymeric binder, said magenta dye comprising a dye represented by the following formula (I):

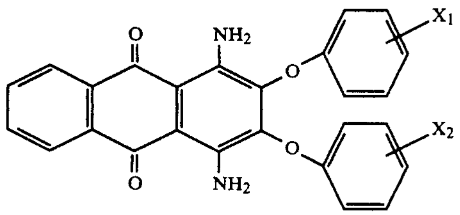

wherein $X_1$ and $X_2$ each represents a hydrogen atom, a halogen atom, a trifluoromethyl group, a $C_1$-$C_6$ alkyl group or a $C_1$-$C_6$ alkoxy group, a dye represented by the following formula (II):

(II)

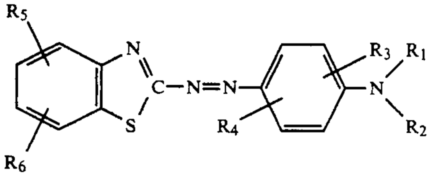

wherein $R_1$ and $R_2$ each represents a hydrogen atom, a $C_1$-$C_6$ alkyl group, a phenyl group, or a $C_1$-$C_4$ alkyl group substituted with a $C_1$-$C_4$alkoxy group, a $C_1$-$C_4$ alkoxy-carbonyl group, a $C_1$-$C_4$ alkyl-carbonyloxy group, an aminocarbonyl group, a $C_1$-$C_4$ alkoxycarbonyloxy group, a cyano group, a phenyl group or a chlorine atom, $R_3$ and $R_4$ each represents a hydrogen atom, a chlorine atom, a $C_1$-$C_6$ alkyl group, a $C_1$-$C_4$ alkoxy group, and $R_5$ and $R_6$ each represents a hydrogen atom, a chlorine atom, a bromine atom, a cyano group, a thiocyano group, a nitro group, a $C_1$-$C_6$ alkyl group, a $C_1$-$C_4$ alkoxy group, a $C_1$-$C_4$ alkylthio group or a $C_1$-$C_4$ alkylsulfonyl group, and a dye represented by the following formula (III):

(III)

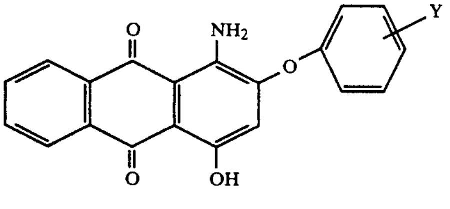

wherein Y represents a hydrogen atom, a halogen atom, a hydroxy group, a $C_1$-$C_6$ alkyl group or a $C_1$-$C_6$ alkoxy group which may have a substituent.

18. A thermal transfer sheet according to claim 17, wherein the magenta dye comprises 10–60% by weight of the dye represented by the formula (I), 90–40% by weight of the dye represented by the formula (II) and 0–60% by weight of the dye represented by the formula (III) based on the total of the dyes represented by the formulas (I), (II) and (III).

19. A thermal transfer sheet according to claim 18, wherein content of the dye represented by the formula (III) is 10–50% by weight.

20. A thermal transfer sheet according to claim 17, wherein the dye (I) is a dye represented by the following formula (IV):

(IV)

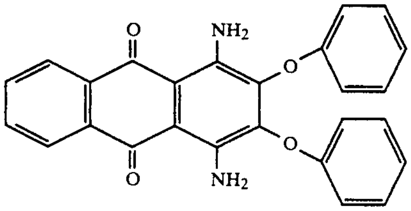

the dye (II) is a dye represented by the following formula (V):

(V)

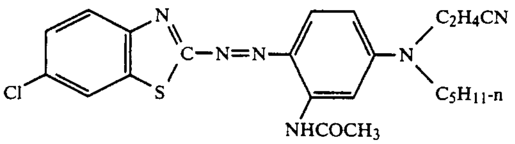

and the dye (III) is a dye represented by the following formula (VI):

(VI)

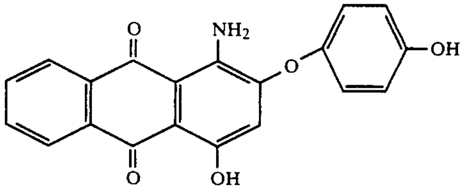

21. A thermal transfer sheet according to claim 20, wherein the magenta dye comprises 10–60% by weight of the dye represented by the formula (IV), 90–40% by weight of the dye represented by the formula (V) and 0–60% by weight of the dye represented by the formula (VI) based on the total of the dyes represented by the formulas (IV), (V) and (VI).

22. A thermal transfer sheet according to claim 21, wherein content of the dye represented by the formula (VI) is 10–50% by weight.

* * * * *